C. W. STARKER.
AXLE COLLAR.
APPLICATION FILED OCT. 9, 1914.
1,259,310.
Patented Mar. 12, 1918.
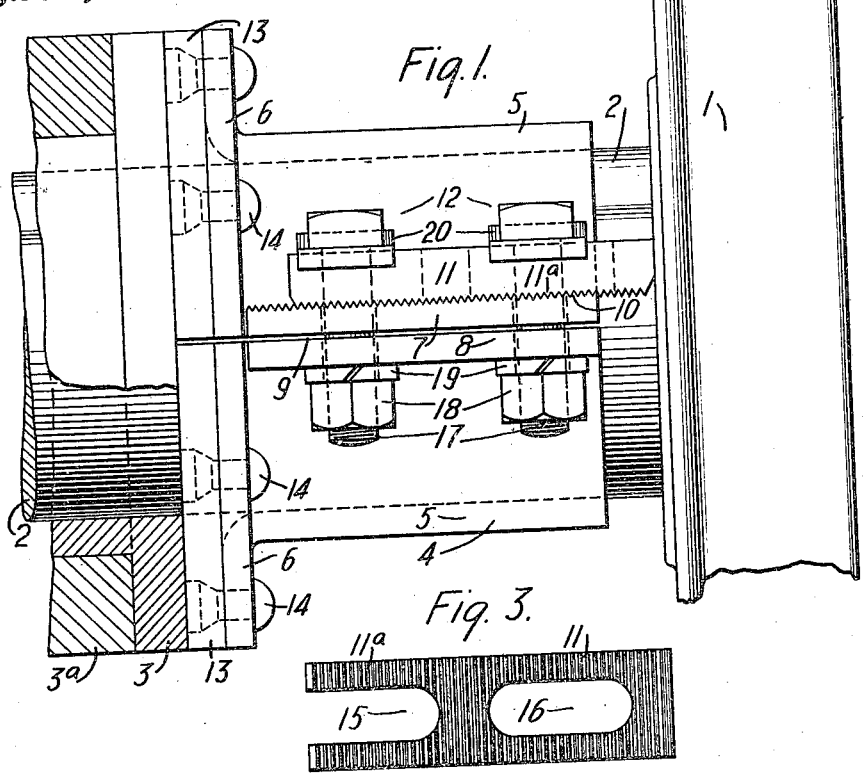
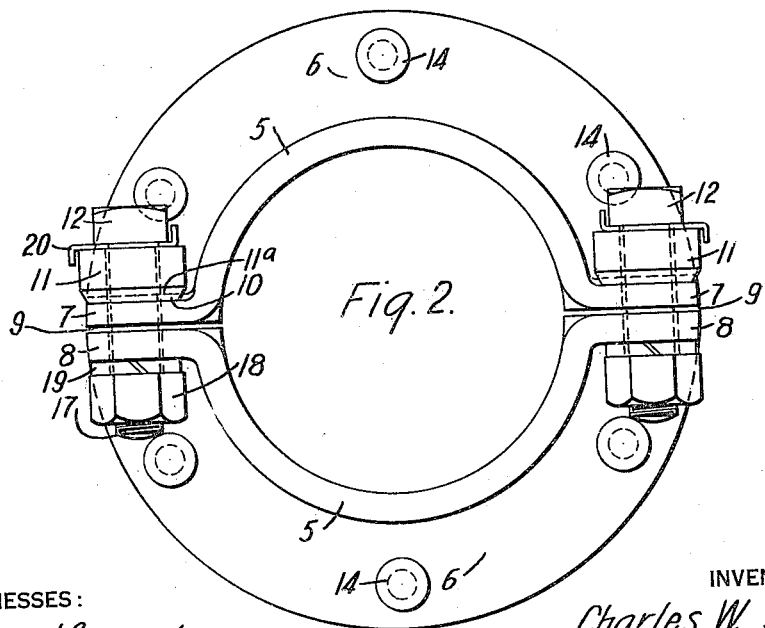
WITNESSES:
Fred A. Lind
W. R. Coley
INVENTOR
Charles W. Starker
BY
Wesley G. Barr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

AXLE-COLLAR.

1,259,310.  Specification of Letters Patent.  Patented Mar. 12, 1918.

Application filed October 9, 1914. Serial No. 865,831.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Axle-Collars, of which the following is a specification.

My invention relates to axle-inclosing devices for spacing purposes, and it has special reference to split axle collars for suitably positioning electric motors on the wheel axles of electric railway vehicles and the like.

The object of my invention is to simplify and reduce the cost of construction and to decrease the weight and number of component parts of devices of the above-indicated character.

More specifically stated, the object of my invention is to provide a split axle collar that embodies a means having the double function of securing the collar parts and an adjustable collar-positioning member together.

In the prior art, the halves of split axle collars have customarily been fastened together in a suitable manner by a plurality of bolts, and, in order to permit of longitudinal adjustment of the collar as a whole along the shaft or axle, some additional means, such as separate longitudinally-disposed bolts operating in threaded lugs, have been provided.

According to my present invention, I provide a multi-part or split axle collar, preferably of light pressed-steel construction, having longitudinally-extending abutting lips on the sides of the split, one of the outer lip surfaces being toothed, a correspondingly toothed collar-positioning rod adjustably meshing with the toothed lip surface and provided with bolt-receiving slots to permit of longitudinal movement, and one or more clamping bolts extending through said slots and said lips to secure the collar parts and the rod together in any desired position. Thus, the same means is provided for securing the parts of the collar together and for positioning the collar, as a whole, along the wheel axle, and the cost, weight and number of parts of the collar are all reduced.

In the accompanying drawing, Figure 1 is a view, in side elevation, of a portion of a vehicle wheel truck; Fig. 2 is a view, in end elevation, of the axle collar shown in Fig. 1; and Fig. 3 is a plan view of a portion of the apparatus illustrated in the other figures.

Referring to Fig. 1 of the drawing, the structure here shown comprises a working member, such as vehicle wheel 1, having a suitable axle or shaft 2; an electric motor supported by the said shaft a predetermined distance from the wheel 1, dependent upon the relative dimensions of the electric motor and the wheel axle, as will be understood, and having an axle bearing 3 that is inclosed by a portion $3^a$ of the motor frame, of customary construction; and a multi-part axle-inclosing spacing member or split axle collar 4.

The axle collar 4 comprises a pair of substantially identical semi-cylindrical halves 5, preferably of light pressed-steel construction, which are provided with peripheral flanges 6 at the ends nearer the electric motor and a pair of longitudinally-extending abutting lips 7 and 8 at each side of the split 9, the outer surface of the lip 7 being provided with corrugations or teeth 10; a collar-positioning member or bar 11, which is provided with a toothed surface $11^a$ for suitably meshing with the teeth 10 of the lip 7; and a suitable clamping means 12, such as bolts, for fastening the collar parts and the collar-positioning bar 11 together.

The exterior surface of each flange 6 is preferably provided with a wearing-plate 13 of hard fiber or similar material which may be secured to the flange by means of suitable rivets 14, the collar as a whole being positioned to cause the wearing-plate 13 to closely engage the end of the axle bearing 3 and thereby prevent, in particular, the lateral movement and consequent "hammering" of the motor.

The collar positioning bar 11, in addition to having the toothed surface $11^a$, is provided with a plurality of longitudinally-extending, centrally-located, bolt-receiving slots 15 and 16. The clamping means 12 preferably comprises a through bolt 17, with the lower end of which a suitable nut 18 and lock washer 19 coöperate, and another washer 20 which is provided with longitudinally-extending flanges to prevent rotation of the bolt, is preferably disposed between the collar-positioning bar 11 and the head of the bolt. It will be understood that any suitable number of bolts may be provided, and also that the collar-positioning bar 11 may be employed on either one or both sides of the collar, as desired.

To position the collar, as a whole, at any desired place on the wheel axle, preferably in direct contact with the motor axle bearing 3, as hereinbefore described, and, in particular, to compensate for wear of the plate 13 on the axle bearing, it is merely necessary to extend the toothed bar 11 to a point where it engages the inner surface of the wheel 1, longitudinal movement of the bar being permitted by reason of the bolt-receiving slots 15 and 16; and the bolts and nuts are then tightened to secure the collar parts rigidly together and to simultaneously mantain the collar-positioning bar 11 in its desired position.

I do not wish to be restricted to the structural details or arrangements of parts herein set forth, but desire that only such limitations shall be imposed as are indicated in the appended claims.

I claim as my invention:

1. The combination with a shaft or axle, a multi-part axle-inclosing device and a longitudinally adjustable member, of means having the double function of securing the parts of said device together and of securing said adjustable member to position the device, as a whole, along the said shaft or axle.

2. The combination with a shaft or axle, a working member associated therewith, a split axle-inclosing device and a longitudinally adjustable member, of means having the double function of securing the split parts together and of securing said adjustable member to position the device, as a whole, along the said shaft or axle with respect to said working member.

3. The combination with a wheel axle, a machine frame disposed thereon, a multi-part axle-inclosing spacing member and a longitudinally adjustable member, of means having the double function of securing the parts of said member together and of securing said adjustable member to position the device, as a whole, along the said axle with respect to said wheel and said frame.

4. In an electric railway vehicle, the combination with a wheel axle, a propelling motor partially supported thereby, a split axle-collar and a longitudinally adjustable member, of means having the double function of securing the collar parts together and of securing said adjustable member to position the collar adjacent to said motor and at a predetermined distance from the corresponding vehicle wheel.

5. The combination with an axle, and a machine frame disposed thereon, of a split collar adapted to inclose said axle, clamping means for the collar parts, and means secured to the collar by said clamping means for positioning the collar, as a whole, along the axle.

6. The combination with an axle, and a machine frame disposed thereon, of a split collar adapted to inclose said axle, a clamping bolt for the collar parts, and an extensible collar-positioning member held in place by said bolt.

7. The combination with an axle, and a machine frame disposed thereon, of a split collar adapted to inclose said axle, and having a portion of its outer surface toothed, a clamping bolt and a collar-positioning member adapted to coöperate with the toothed surface of the collar and secured in any desired position by said bolt.

8. The combination with an axle, and a machine frame disposed thereon, of a split collar adapted to inclose said axle, and having longitudinally-extending abutting lips on the sides of the split, the outer surface of one of said lips being toothed, a plurality of clamping bolts extending through said lips, and a toothed collar-positioning bar adjustably meshing with said toothed-lip surface and provided with bolt-receiving slots for attachment to said lips in any desired position.

9. A multi-part axle-inclosing collar embodying an extensible collar-positioning member, and a means for holding said member and the collar parts together.

10. A split axle collar having a portion of its outer surface toothed, an extensible collar-positioning member adapted to coöperate with the toothed surface of the collar, and a clamping means for the collar parts and said member.

11. A split axle collar having longitudinally-extending abutting lips on the sides of the split, the outer surface of one of said lips being toothed, a toothed collar positioning bar adjustably meshing with said toothed lip surface and provided with a bolt-receiving slot, and a clamping bolt extending through said slot and said lips to secure the collar parts and said bar together.

In testimony whereof, I have hereunto subscribed my name this 7th day of Oct., 1914.

CHARLES W. STARKER.

Witnesses:
O. C. SCHOENFELD,
B. B. HINES.